March 9, 1926.  1,576,003
J. W. REDDY
MEASURING DEVICE
Filed May 12, 1924 2 Sheets-Sheet 1
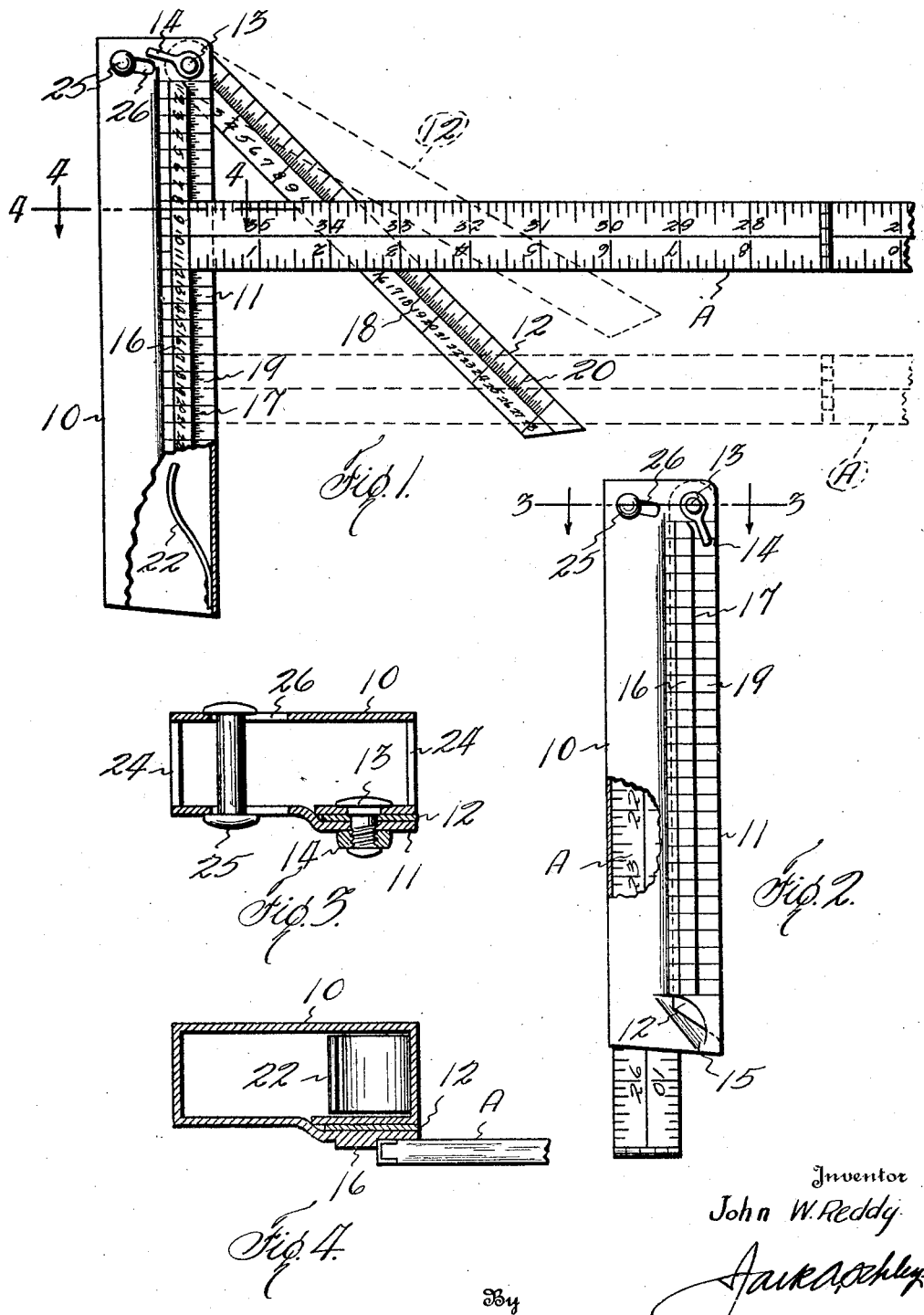
Inventor
John W. Reddy
By
Jack A. Schley
Attorney March 9, 1926.
1,576,003
J. W. REDDY
MEASURING DEVICE
Filed May 12, 1924   2 Sheets-Sheet 2
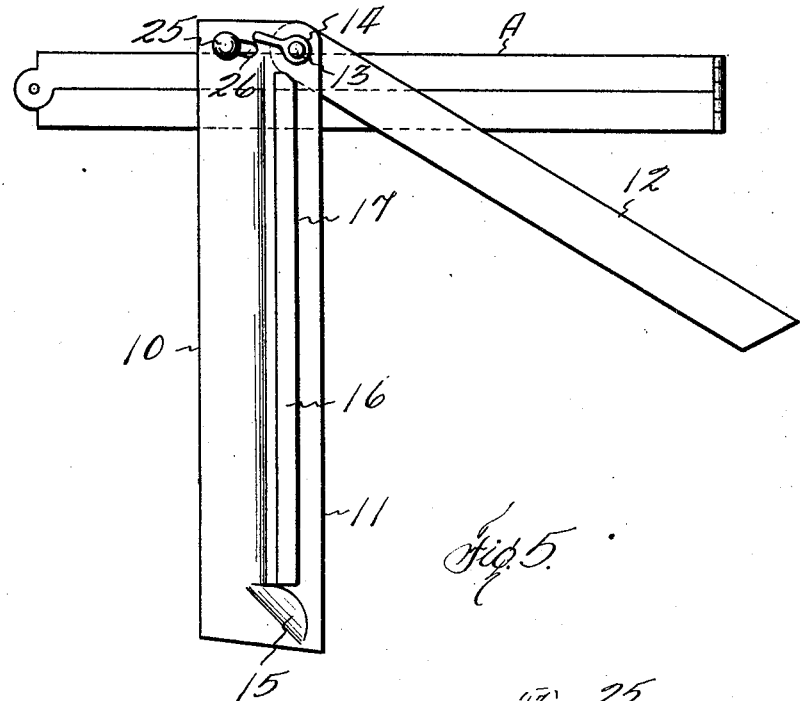
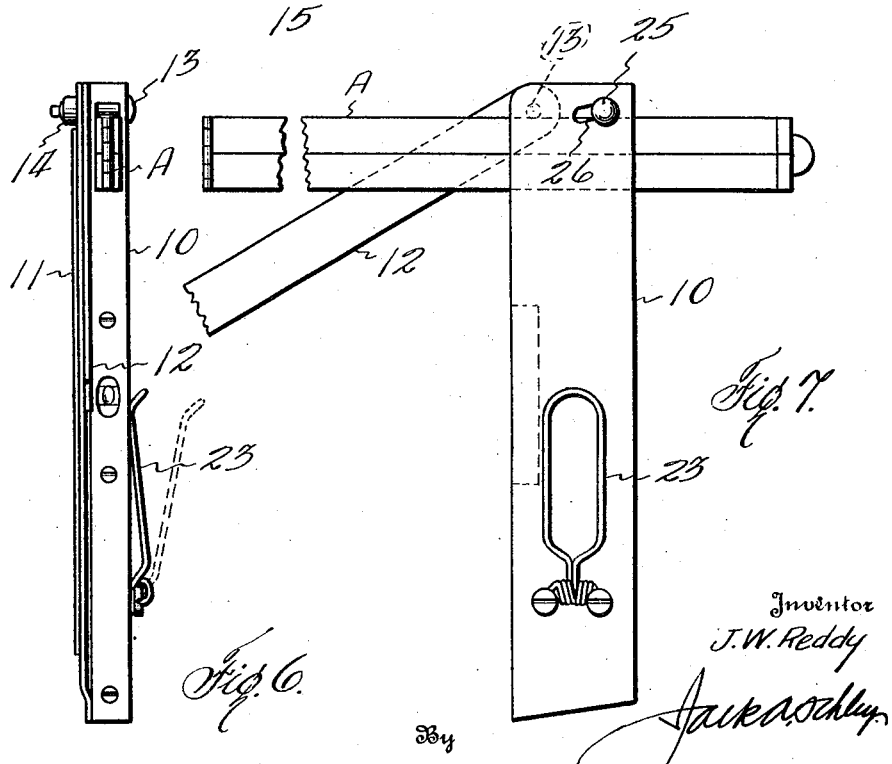
Inventor
J. W. Reddy
By Jack A. Ochley
Attorney Patented Mar. 9, 1926.

1,576,003

UNITED STATES PATENT OFFICE.

JOHN W. REDDY, OF BOWIE, TEXAS.

MEASURING DEVICE.

Application filed May 12, 1924. Serial No. 712,504.

*To all whom it may concern:*

Be it known that I, JOHN W. REDDY, citizen of the United States of America, residing at Bowie, in the county of Montague and State of Texas, have invented certain new and useful Improvements in Measuring Devices, of which the following is a specification.

This invention relates to new and useful improvements in measuring devices.

The object of the invention is to combine in a single instrument the functions of a square, bevel calculator, etc.

A further object is to provide an instrument having graduations of measurement based upon the scale and proportions commonly employed by carpenters and mechanics, whereby with the assistance of an ordinary rule various angular cuts and lengths of timbers and the like may be figured.

Another feature is to provide the instrument in a convenient form whereby the rule may be carried therewith and a compact and efficacious device had.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is an elevation of an instrument constructed in accordance with my invention in position for calculating an angular cut, Fig. 2 is an elevation of the instrument folded, Fig. 3 is an enlarged cross-sectional view on the line 3—3 of Fig. 2, Fig. 4 is an enlarged cross-sectional view on the line 4—4 of Fig. 1, Fig. 5 is an elevation of the instrument with the rule in position as a square and the blade adjusted to give both cuts of a roof rafter, Fig. 6 is a side elevation of the instrument as is shown in Fig. 5, and Fig. 7 is a rear elevation of the parts as is shown in Fig. 5.

In the drawings the numeral 10 designates an elongated metallic case, rectangular in cross-section and open at its lower end. On its face and contiguous to its side the case has an overlying flange 11 spaced from its surface to form a longitudinal pocket for receiving a bevel blade 12. The blade is pivoted at its upper end on a bolt 13, penetrating the case and the flange. A thumb nut 14 confined on the bolt bears against the flange and when tightened clamps the blade between the flange and the case. The lower end of the flange is flattened upon the casing and is provided with an opening 15 through which the bevelled end of the blade 12 is exposed when the said blade is folded. This permits the thumb nail to be inserted to dislodge the blade when it is desired to open the same.

A longitudinal flat rib or bar 16 is formed or provided on the face of the flange with its working edge parallel and set back of the side edge of the case. The side or operative edge of the rib is co-incident with a line 17 bisecting the pivot of the blade and which line intersects with a central gauge line 18 extending longitudinally of the blade and parallel to its edges. The rib has graduations numbered consecutively by starting from 0 at the intersection of the lines 17 and 18. These graduations, in the present instance are spaced exactly one-quarter of an inch apart, each representing one foot in scale of one-quarter of an inch to one foot. This is the scale commonly used in building. Each graduation space is divided, on the panel 19 between the rib and the edge of the case, into an equal number of sub-divisions on the basis of twelve inches to the foot.

The blade 12 on one side of its line 18 has graduations like the rib, while on the opposite side of said line it has graduations 20 like the panel 19. A folding rule A is used in connection with the instrument and is placed with one edge abutting the rib as is shown in Fig. 1 in which position it may be held by the thumb of the left hand in which the case is grasped. The blade 12 is swung by the right hand. The blade is fastened in adjusted positions by means of the thumb nut 14.

When the instrument is not in use the blade is swung into the pocket under the flange 11 and the rule is inserted in the case. A curved flat spring 22 secured in the case bears against the edge of the rule, (Figs. 1 and 4) and holds it in the case. A spring clip 23 on the rear side of the case serves as a means for fastening the case in the pocket of the workman's clothing. The upper end of the case is closed, but it has opposite slots 24 in its side edges through which the rule A may be passed at right angles to the case, as is shown in Figs. 5, 6 and 7. A headed pin 25 engages in slots 26 inclined so that the pin may be slid into frictional contact with the upper edge of the rule for fastening the latter in the slots.

With the rule in the slots 24, it forms, with the case 10, a square; while the blade functions as a bevel. It will be seen that with the blade 12 adjusted to a given degree, the angle formed with the case will give the ridge cut of a rafter and the angle formed with the rule will give the plate cut.

In using the instrument for cutting roof rafters, the rule A is unfolded, placed against the rib 16 at right angles thereto, and held by the thumb of the left hand in which the case 10 is grasped. The rule is slid so that the upper edge registers with "12" on the rib and the blade 12 is swung outwardly until the gauge line 18 registers with the point on the rule giving the desired rise. The thumb nut 14 is then tightened. The instrument is now set for the desired pitch or bevel. To obtain the length of the rafter, calculate one-half the width of the gable and move the rule down the rib until its upper edge registers with the designation corresponding to such calculation. For instance if the gable has a width of thirty-two feet the rule A would be moved to the designation "16" and the point at which the rule intersected with the line 18 would give the length of the rafter, which would vary in accordance with the angle at which the blade was set. By folding the rule and inserting at the slots 24 the plate cut is obtained. Various other calculations may be worked out along this line.

In calculating ratio, as for instance footage where boards are twenty inches wide, say 1x20 inches any length, the upper edge of rule A is placed at "12" on scale of rib 16 and blade 12 is swung until "20" registers with the upper edge of the rule, after which blade is fastened. Now when the rule is moved along the rib 16, to the numeral designating the length of the board to be calculated, the footage of the board will be given on the blade. If the board is less than 12 inches wide, the operation is reversed, and the footage indicated on the rib.

What I claim is:

1. In a measuring instrument, a support having a transverse slot at one end and a scaled guide for engaging the end of a separate rule when cooperating therewith, retaining means upon the support for engaging said rule when disposed in said slot at a right angle to the guide, and a blade pivoted on the support and adapted to cooperate with said rule when the latter is used in connection with the scaled guide.

2. In a measuring instrument, a support having a socket at one end with parallel slotted walls to receive a separate rule when disposed at an angle to the support, a friction pin mounted in said slots for movement into contact with said rule, and a graduated guide upon the support adapted to be slidingly engaged by one end of said rule when removed from the socket.

3. In a measuring instrument, an elongated case open at one end for receiving a folded rule, a spring within the case for retaining the rule therein, a socket at one end of the case having parallel slotted walls to receive said rule, a frictional holding member mounted in said slots, a blade pivoted at one end of the case and foldable therein, and a graduated guide rib at one edge of the case having an angular face for engagement with a free end of a separate rule.

In testimony whereof I affix my signature.

JOHN W. REDDY.